United States Patent
Jalla

(10) Patent No.: US 11,402,820 B2
(45) Date of Patent: *Aug. 2, 2022

(54) METHOD AND SYSTEM FOR BUILDING FRAMING AND MANUFACTURING SYSTEM

(71) Applicant: Consulting Engineers, Corp., Reston, VA (US)

(72) Inventor: Maharaj Jalla, Great Falls, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,777

(22) Filed: Mar. 17, 2020

(65) Prior Publication Data

US 2021/0294298 A1 Sep. 23, 2021

(51) Int. Cl.
*G06F 30/13* (2020.01)
*G05B 19/4097* (2006.01)
*G06F 119/18* (2020.01)

(52) U.S. Cl.
CPC ......... *G05B 19/4097* (2013.01); *G06F 30/13* (2020.01); *G05B 2219/35134* (2013.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 2006/0136179 | A1* | 6/2006 | Sit | G06F 30/00 703/1 |
| 2008/0109330 | A1* | 5/2008 | Torres | G06Q 10/087 705/29 |
| 2015/0234377 | A1* | 8/2015 | Mizikovsky | G06F 30/13 700/98 |
| 2015/0363730 | A1* | 12/2015 | Crane, Jr. | G06Q 50/28 705/7.25 |
| 2016/0210377 | A1* | 7/2016 | Bumbalough | G06F 30/13 |
| 2018/0025452 | A1* | 1/2018 | Fadeev | G06Q 50/165 705/315 |

* cited by examiner

*Primary Examiner* — Kenneth M Lo
*Assistant Examiner* — Istiaque Ahmed
(74) *Attorney, Agent, or Firm* — Andrew Morabito

(57) ABSTRACT

The present invention is a method for developing a structure design comprising: generating, a catalog of building components; designing, a set of templates for a structure; identifying, a set of restrictions associated with a plot; receiving, a request for a specific type of structure to be constructed on the plot of land; providing, the set of templates of the type of structure, wherein the set of templates are distinct versions of the structure type and receiving a selection of one of the templates; receiving, a set of alterations to the template, wherein a final design is constructed; analyzing, the final design to identify each building component; producing, a pre-assembly plan for the final design; generating, a bill of materials for the final design, wherein the bill of materials accesses the catalog of building components; analyzing, the building components within the bill of materials.

17 Claims, 14 Drawing Sheets

Material

| QUALIFIED VENDORS | DESIGN TIME | SUBTOTAL | MATERIAL DELIVERY TIME ESTIMATE | |
|---|---|---|---|---|
| ⦿ Option 1 (Best Price Composition) | 5 Days | $600.00 | upto 12 weeks | 🛒 |
| ○ Option 2 (Best Delivery Time) | 5 Days | $800.00 | 1 weeks | 🛒 |
| ○ Option 3 (Best Deal Time Price) | 5 Days | $650.00 | 2 weeks | 🛒 |
| ○ Option 4 (Best Price Certified in Brazil) | 5 Days | $700.00 | 2 weeks | 🛒 |
| ○ Option 5 (Best Price Certified International) | 5 Days | $650.00 | 12 weeks | 🛒 |

Shipping

| QUALIFIED SHIPPERS | PRICE |
|---|---|
| ⦿ Shipper 1 (Best Price) | $100.00 |
| ○ Shipper 2 (Best Time) | $110.00 |
| ○ Shipper 3 (Best Deal compared to your timeline) | $120.00 |

Checkout

My Account | My Wishlist | My Cart | Checkout | Log In

Search | Search entire store here... | GO

YOUR CHECKOUT PROGRESS
BILLING ADDRESS | Change

Victor
Pheonix
Arizona, 85750
United States
T: (520) 111-1111

PAYMENT METHOD | Change

Pay by Credit Card

1. Checkout Method — EDIT
2. Billing Information — EDIT
3. Shipping Information — EDIT
4. Shipping Method — EDIT
5. Payment Information ⦿ Pay By Credit Card
   You will be required to enter your payment details before you place an order ○ Financed by I & I
   ○ Financed by Bank A
   ○ Financed by Bank B
   ○ Construcard
   ○ Cartao BNDES
   ○ Deposit (Boleto)

<< Back

6. Order Review

* Required Field

Assembly Pricing

Delivery is required for Assembly
Prices below do not reflect delivery portion

| Value of merchandise to be assembled | Pricing to Customer |
|---|---|
| Sofas* | |
| $0-$299 | $39 |
| $300-$599 | $79 |
| $600-$999 | $149 |
| $1000-$1499 | $249 |
| $1500-$1999 | $349 |
| $2000-$2499 | $459 |
| $2500-$2999 | $559 |
| $3000-$3499 | $669 |
| | $769 |

- $50 total wall mounting fee for all units and frames on assembly orders.
- Each additional tier of $500 value of merchandise is an additional $100 for assembly
- Sofa pricing is $39 per article number. Sofa assembly includes the assembly of the sofa and placement of slipovers

FIG. 14

METHOD AND SYSTEM FOR BUILDING FRAMING AND MANUFACTURING SYSTEM

BACKGROUND

This disclosure relates generally to providing building and construction information, and particularly to a method for interfacing with the structure design and development process by way of a depiction of the structure.

Generally, a specification for construction or manufacture of a building or other structures is prepared by making design drawings including structural drawings, building drawings, and facility drawings, analyzing the drawings to get data for estimating the construction cost, and to calculate the detail cost for each construction material or construction process from the data. Construction of a building or a structure proceeds based on the specification.

Traditionally, the process of designing and building a structure begins with an architect or other party sketching conceptual ideas for the structure. Most commonly, an architect's initial sketches are done in pen or pencil, usually starting with a blank sheet of paper, allowing conceptual ideas to flow quickly and freely. The sketches may go through a number of iterations until the design is sufficiently refined that the parties feel it is ready for more formal rendering. A draftsman (or a team of draftsmen) then turns the sketches into drafts of architectural plans. For larger, more complex structures, the process branches at this point such that different professionals develop different aspects of the plans, such as foundation, superstructure, curtain walls, heating, ventilation, and air conditioning (HVAC), interior design, and so forth.

In certain projects, a model building process may follow the sketch process. The model may still be conceptual and provides a three-dimensional view of a proposed structure. Models, like sketches are intended to both illustrate and elicit design ideas. Therefore, models may be constructed such that they can be easily reconfigured to explore design ideas.

This sketch (and model) refinement process is well established and historically has been a relatively effective practice. However, a number of modern developments challenge the effectiveness of such practices. For example, there is ever-increasing pressure to reduce the time required to produce a complete building design. The less time required to design, the lower the cost of the design process and the quicker the structure can move to the building stage.

Using CAD (Computer Aided Design) program is now common for making building or construction drawings. However, even for drawings made by using a CAD program, analyzing drawings was done manually. In the manual operation, an operator checks each construction material and each construction process illustrated on the drawings, estimates the amounts of construction materials or elements, and calculates the cost using an electronic calculator or a program for that purpose. The manual operation takes a long time even with multiple operators.

There have been efforts to overcome the disadvantage of the manual operation for calculating the amounts and the unit costs for construction elements required for construction of a building or other structure, by automating the operation with computer. However, they fail to allow for any customization of the building and only provide quick results for set designs and set materials.

It is desired for a system and method that would substantially reduce the construction period and construction cost by automating the design, and analysis step of the building to provide an accurate estimate as to the building cost, materials, and time to the end user's custom requirements.

SUMMARY

In a first embodiment the present invention is a computer implemented method for developing a structure design comprising: generating, by one or more processors, a catalog of building component specifications; designing, by one or more processors, a set of templates for a predefined number of structures, wherein the set of templates are based on a structure type; receiving, by one or more processors, a set of information associated with a plot; identifying, by one or more processors, a set of restrictions associated with the plot; receiving, by one or more processors, a request a template from the set of templates to be constructed on the plot of land; manipulating, by one or more processors, the template based on the set of restrictions associated with the plot; implementing, by one or more processors, a set of alterations to the selected template, wherein a final design is constructed; analyzing, by one or more processors, the final design to identify each building component; producing, by one or more processors, a pre-assembly plan for the final design; generating, by one or more processors, a bill of materials for the final design, wherein the bill of materials accesses the catalog of building components; analyzing, by one or more processors, the building components within the bill of materials, and selecting building suppliers based on available shipping methods to the plot; and calculating, by one or more processors, a time-line for the shipping and construction of the structure.

In a second embodiment the present invention is a computer program product for constructing a building, the computer program product comprising a computer readable non-transitory storage medium having program instructions embodied therewith, the program instructions executable by a computing device to cause the computing device to: program instructions to compile a catalog of building components, wherein each building component has an associated set of specifications and suppliers; program instructions to design a set of structure templates, wherein each structure template is related to a specific structure type; program instructions to request information associated with a plot, wherein the information is analyzed to establish a set of plot restrictions; program instructions to receive a request to build a structure on the plot, wherein it is determined if the structure can be built based on the plot restrictions and wherein it is determined the structure can be built; program instructions to provide a set of allowed templates for the structure; program instructions to receive the selection of a template; program instructions to amend the template based on requests received, wherein a final design is formed; program instructions to quantify the building components of the final design, wherein the pre-fabrication requirements are assessed; program instructions to generate a bill of materials, wherein the bill of materials identifies approved building component suppliers; program instructions to calculate a construction process for the structure based on the building component suppliers, a sequence for assembly, and availability of the building components.

In a third embodiment the present invention is a system comprising: a CPU, a computer non-transitory readable memory and a computer readable storage medium associated with a computing device; program instructions to compile a catalog of building components, wherein each building component has an associated set of specifications and suppliers; program instructions to design a set of structure templates, wherein each structure template is related to a specific structure type; program instructions to request information associated with a plot, wherein the information is analyzed to establish a set of plot restrictions; program instructions to receive a request to build a structure on the plot, wherein it is determined if the structure can be built based on the plot restrictions and wherein it is determined the structure can be built; program instructions to provide a set of allowed templates for the structure; program instructions to receive the selection of a template; program instructions to amend the template based on requests received, wherein a final design is formed; program instructions to quantify the building components of the final design, wherein the pre-fabrication requirements are assessed; program instructions to generate a bill of materials, wherein the bill of materials identifies approved building component suppliers; program instructions to calculate a construction process for the structure based on the building component suppliers, a sequence for assembly, and availability of the building components.

BRIEF DESCRIPTION OF THE DRAWINGS

Referring now to the drawings in which like reference numbers represent corresponding parts throughout:

FIG. 11 illustrates a user interface showing a customization feature, in accordance with one embodiment of the present invention.

FIG. 12 illustrates a user interface showing a customization feature, in accordance with one embodiment of the present invention.

FIG. 13 illustrates a user interface showing a customization feature, in accordance with one embodiment of the present invention.

FIG. 14 illustrates a user interface showing a customization feature, in accordance with one embodiment of the present invention.

DETAILED DESCRIPTION

Figure 1:
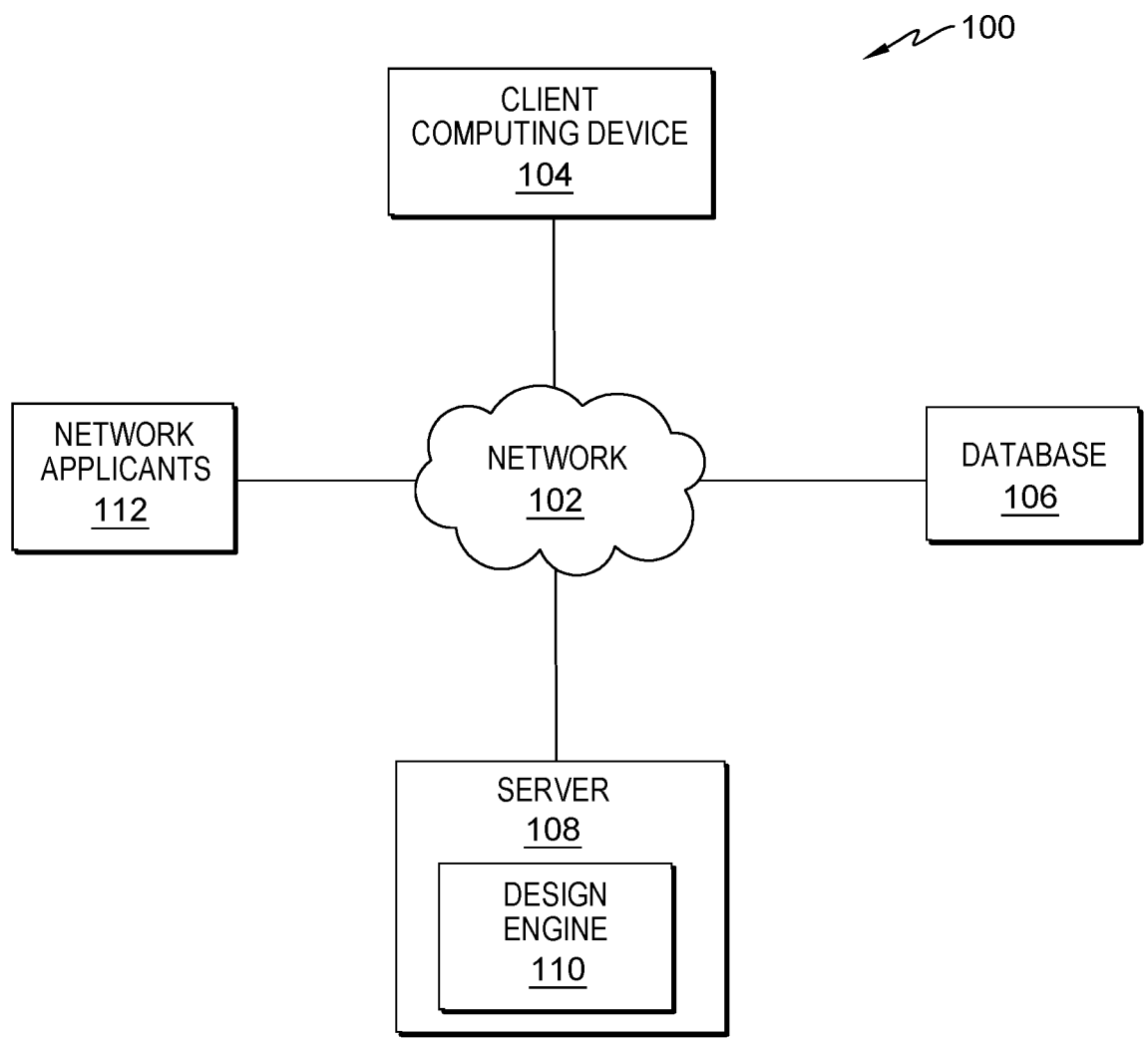
FIG. 1 depicts a high-level distributed network environment, in accordance with one embodiment of the present invention

The present invention generally relates to a system which provides for a process to design a structure, analysis the designed building, and the implementation of building the structure. The present invention provides for the advantageous over the prior art to provide for an improved design assistance for a user in the context of creating a structure design, analyzing the structure, and implementing the construction of the structure.

Thus, embodiments of the invention may be implemented as methods, apparatus, or articles of manufacture as or in software, firmware, hardware, or any combination thereof. As used herein, article of manufacture (or alternatively, computer program product) is intended to encompass logic and/or data accessible from any computer-readable device, carrier, or media.

Those skilled in the art will recognize many modifications may be made to this exemplary environment without departing from the scope of the present disclosure. For example, it will be appreciated that aspects of the present disclosure are not dependent upon data structure formats, communications protocols, file types, operating systems, database management system, or peripheral device specifics. Accordingly, the following description is provided without reference to specific operating systems, protocols, or formats, with the understanding that one skilled in the art will readily be able to apply this disclosure to a system and format of choice.

As used herein, a "structure" may be, but is not limited to, habitable buildings, functional structures, artistic structures, and so on, and the nature of the structure does not form a limitation on the scope of the present disclosure. In addition, as used herein, "designing" is intended to mean all aspects of preparing plans for implementing a structure, including but not limited to developing a set of documents that describe a structure and aspects of its construction, as well as estimates relating to the design and construction of the structure. Designing a structure may optionally include the materials for and processes of obtaining prerequisite certifications and approvals for constructing the designed structure. In many cases, designing a structure is a collaborative endeavor between individuals and organizations. As well, as used herein, "implementation" is intended to mean verifying aspects of a design, arranging accessibility to required parts, services, and personnel, maintaining a project timeline, maintaining a project budget, managing changes during the build phase, financing and insurance, and constructing the structure. Optionally, implementation may also include coordinating and obtaining approvals, permits, and the like.

Furthermore, as used herein, "manipulation" of (or to "manipulate") a design includes but is not limited to adding elements to a design, subtracting elements from a design, reconfiguring portions of a design, moving portions of a design, partially or fully relocating a design on a site, requesting and viewing attributes about a design, implementing automated optimization of a design, checking aspects of a design for structural soundness or against codes or regulations for such a design, comparing alternative designs, developing cost estimates, construction time, and other attributes of a structure built according to a design, and so on.

Still further, as used herein, "interface" is intended to include data structures, virtual and physical connections between devices, computer-human user interface, and other mechanisms that facilitate the exchange of data between computer systems and/or control of one or more such systems. In one embodiment, an interface requires a minimum or no user data entry or manual delivery of data from one system to another. In another embodiment, data that needs to be entered manually may be retained and reused within the system, reducing future data entry requirements.

According to the present disclosure, a user interacts with a computer system and controls provided thereby to design a structure. In the process, the system may communicate with other systems to obtain data, verify data, deliver data, store or retrieve data, etc. Those other systems may be interfaces to other computer-user interactions or be autonomous or some combination of the two. By way of a network, the systems and methods thereby facilitate collaboration between multiple individuals and/or organizations in the design, analysis, and implementation of a structure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 depicts a block diagram of a computing environment 10 in accordance with one embodiment of the present invention. FIG. 1 provides an illustration of one embodiment and does not imply any limitations regarding the environment in which different embodiments maybe implemented.

In the depicted embodiment, computing environment 100 includes network 102, patient computing device 104, database 106, and server 108. Computing environment 100 may include additional servers, computers, or other devices not shown. A distributed network environment 100 is shown, comprising hardware and software, within which various embodiments of the present disclosure may be employed. More specifically, distributed network environment 100 comprises multiple interconnected elements of hardware, each running software, allowing those elements of hardware to communicate with one another, whether by wired or wireless connection.

Network 102 may be a local area network (LAN), a wide area network (WAN) such as the Internet, any combination thereof, or any combination of connections and protocols that can support communications between client computing devices 104, server 108 in accordance with embodiments of the invention. Network 102 may include wired, wireless, or fiber optic connections. Alternatives to client computing devices 104, or additional computer mechanisms include personal computers, servers that are personal computers, minicomputers, personal digital assistants (PDAs), mainframes, etc. The network within which the various embodiments of the present disclosure operates may also comprise additional or fewer devices without affecting the scope of the present disclosure.

Client computing devices 104 may be a management server, a web server, or any other electronic device or computing system capable of processing program instructions and receiving and sending data. In some embodiments, client computing device 104 may be a laptop computer, tablet computer, netbook computer, personal computer (PC), a desktop computer, or any programmable electronic device capable of communicating with personnel computing device 106 and server 108 via network 102. In other embodiments, client computing device 104 may represent a server computing system utilizing multiple computers as a server system, such as in a cloud computing environment. In another embodiment, client computing device 104 represents a computing system utilizing clustered computers and components to act as a single pool of seamless resources. Client computing device 104 may include components, as depicted and described in further detail with respect to FIG. 1.

Database 106 may be a repository that may be written to and/or read by design engine 110. In one embodiment, database 106 is a database management system (DBMS) used to allow the definition, creation, querying, update, and administration of a database(s). In the depicted embodiment, database 106 is connected to network 102. In other embodiments, database 106 resides on servers or computing devices, provided that database 106 is accessible to design engine 110.

Server 108 may be a management server, a web server, or any other electronic device or computing system capable of processing program instructions and receiving and sending data. In other embodiments server 108 may be a laptop computer, tablet computer, netbook computer, personal computer (PC), a desktop computer, or any programmable electronic device capable of communicating via network 102. In one embodiment, server 108 may be a server computing system utilizing multiple computers as a server system, such as in a cloud computing environment. In one embodiment, server 108 represents a computing system utilizing clustered computers and components to act as a single pool of seamless resources. In the depicted embodiment design engine 110 is located on server 108. Server 108 may include components, as depicted and described in further detail with respect to FIG. 1.

design engine 110 operates to perform the design, analysis, and implementation of the structure. The design engine 110 is able to provide a generated model and all the required materials and costs or can take a custom design of a structure and calculate the estimated materials and cost to construct the building. In the depicted embodiment, design engine 110 utilizes network 102 to access the client computing devices 104 and the servers 108 and communicates with database 106. In one embodiment, design engine 110 resides on client computing device 104. In other embodiments, design engine 110 may be located on another server or computing device, provided design engine 110 has access to database 106 and the other components of computing environment 100.

Additional elements of hardware include, but are not limited to, network appliances 112 such as remote storage, each communicating via the network 102. The client computer devices and servers generally may be referred to as computer devices. Other computer devices, such as mobile computationally enabled telephone handsets (so called "smart phones"), tablet-style computer devices, and so on may also form a part of network environment 100.

As is well known, software components supporting client computing devices 104, server 108, and additional network appliances, and so on include or reference logic and/or data that may form a part of the software component or be embodied in or retrievable from some other hardware of software device or signal, either local or remote and coupled via a network or other data communications device.

Figure 2:
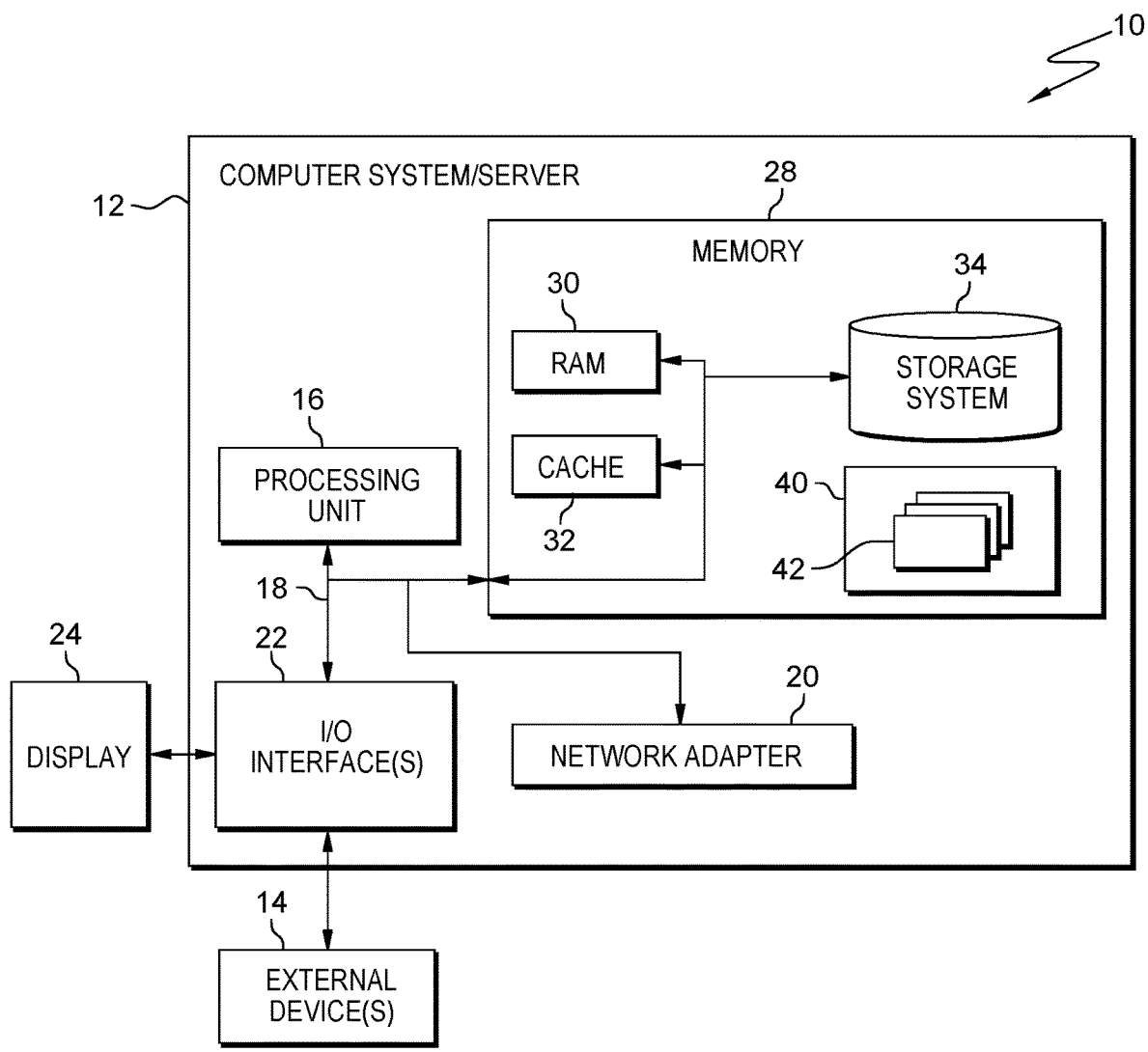
FIG. 2 depicts a block diagram depicting the internal and external components of the server and computing devices of FIG. 1, in accordance with one embodiment of the present invention.

FIG. 2 depicts a block diagram depicting the internal and external components of the server and computing devices of FIG. 1, in accordance with one embodiment of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 3:
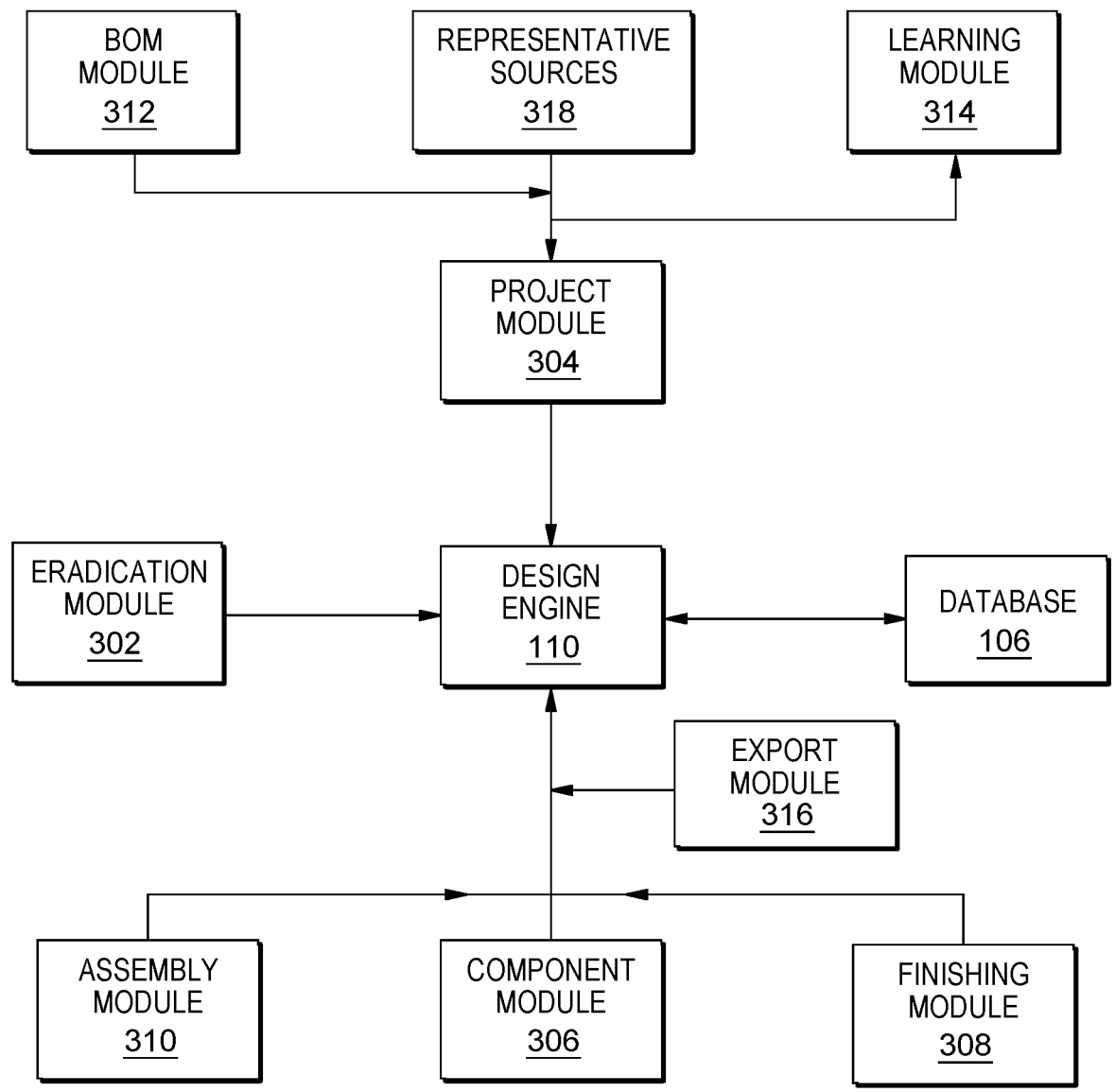
FIG. 3 depicts a portion of a computer-implemented system for structures design, analysis, and implementation, in accordance with one embodiment of the present invention.

FIG. 3 depicts a portion of a computer-implemented system 300 for structures design, analysis, and implementation of the structure design, in accordance with one embodiment of the present invention. The system 300 comprises a design engine 110 that manages aspects of the structure design, the structure analysis, and the implementation of the structure design. Design engine 110 may be realized in software, firmware, hardware, etc.

Design engine 110 provides an output in the form of data representing a structure that is rendered in a design workspace, analyzing the structure to determine a bill of materials for the construction of the structure, and implementing the costs and associated factors in the building of the structure. The design engine 110 may rely on additional or external tools to render the structure such as AutoCAD or other 3D modeling software. Through a user interface, the client is able to view on the client computing device 104 the structure and the additional information.

The design engine 110 is fed information from the various modules as the design engine 110 process from one step to the next in the design process.

The edification module 302 assists in the determination of the type of structure which is to be created. This can be, but not limited to, residential, commercial, industrial, institutional, etc.

The project module 304 provides for the overall design of the structure. The project module 304 may either provide a set of structure designs for the client to select from, or may receive, in some capacity, a custom design or drawing of the building provided by the client. In the first instance, where the project module 304 provides the client with a set of template structure designs based on the edification selection. In some embodiments, the client is able to select a template, and is provided with the opportunity to make predetermined alterations to the template, such as changing the shape of the structure, changing the number of floors of the structure, or changing the floorplan of each floor, etc. These templates may include all sheathing materials, insulation, piping, HVAC, electrical, furniture, appliances, windows, roofing, elevators, sprinkler systems, and the like. It may also include landscaping, driveway, paving, and the like as well.

In the second instance, the client (or a third party) provides either a drawing or a 3D model of the custom design for the structure. The design engine 110 is able to modify the drawing or the 3D model to work with the project module 304 so that the follow steps can be completed on the custom design. This may include extracting a 3D model from the drawings or converting the 3D model to an acceptable format. In some embodiments, the design engine 110 is able to assess the custom template for structural integrity and meeting building requirements.

The project module 304 may access representative sources 318 to assist in the adjustment of the template data or to create the virtual model of the structure. These representative sources 318 may be topographical data, geological data, design and building codes, design and building practices, drawings, illustrations, 3D models, client templates, or the like. The representative sources 318 may be clients, third parties, local, state, or federal governments or agencies and the like.

The component module 306 provides for the client to customize the functional design of the structure. This may include changing the roof pitch, the wall type, the floor joists, the wall member spacing, the location of the garage and windows, and the like. These design changes may be limited based on safety building requirements, feasibility, and the like.

The finishing module 308 provides for the client to change aesthetics of the structure, this may include the tile color, the floor style, and other interior and exterior aspects of the building. These types of changes will not affect the structure in a physical manner.

The assembly module 310 generates the various images, models, and visual depictions of the structure, sections of the structure, or components which are presented to the client. The requests of the client, the structure may be generated to show various stages of the assembly process and may show the structure at various steps of the design process. For example, upon the selection of the footprint of the structure and the number of floors, a model of the frame of the building may be generated by the assembly module 310. The assembly module 310 may use a third-party software to generate the visual representations.

The assembly module 310 also assists in the preparation of the building materials and the structure regarding the packaging of the materials and frame members. The pre-mounting of various components, any coatings or sealants which can be applied to various components of the structure, and the like. For example, this may include have the wall and floor panels or the roof trusses to be pre-assembled.

The assembly module 310 may also provide anticipated delivery times of materials, design time, construction time, and the like.

The BOM module 312 is able to provide the Bill of Materials (BOM) for the structure, and calculates a cost estimate of the design based on the known materials, and an implementation of the cost of the known materials based on the module's known price indexing for both the materials, construction, installation, and competition of the project. This may include material costs, labor costs, permit costs, etc. based on both geographical location and mark fluctuations.

Pursuant to the selections made by the client, the BOM module 312 is able to estimate, to a high degree of accuracy, the cost for materials, the cost for pre-fabrication, the cost of delivery, the cost of construction, and a general overall cost of the project. In some embodiments, the BOM module 312 is able to provide options based on the manufacture, construction company, and the like that provide the client with the ability to select a time frame, grade of materials, and construction time that meets their requirements or their budget.

The BOM module 312 may have a set of pricing quotes for a plurality of tasks to allow the client transparency in the billing.

The BOM module 312, may also provide for various types of financing options which the client can use. Predominantly these financing options are third parties which the design module 110 connects the client with.

The database 106 provides for the storage location for the various modules.

The learning module 314 provides for the ability to generate new templates and designs based on the received data from the client and the modules. When custom designs are received, processed, and determined to be feasible, the learning module 314 is able to take this data, and determine additional designs which could be provided to the client as template or standard designs.

The export module 316 provides for the output from the design engine 110 to the client computing devices 104 and controls the user interface, and the adjustments of the user interface as the client progress from one step to the next, and how the user interfaces interacts with the client.

With the selection of the type of structure the edification module 302 communicates with the design engine 110, the design engine The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
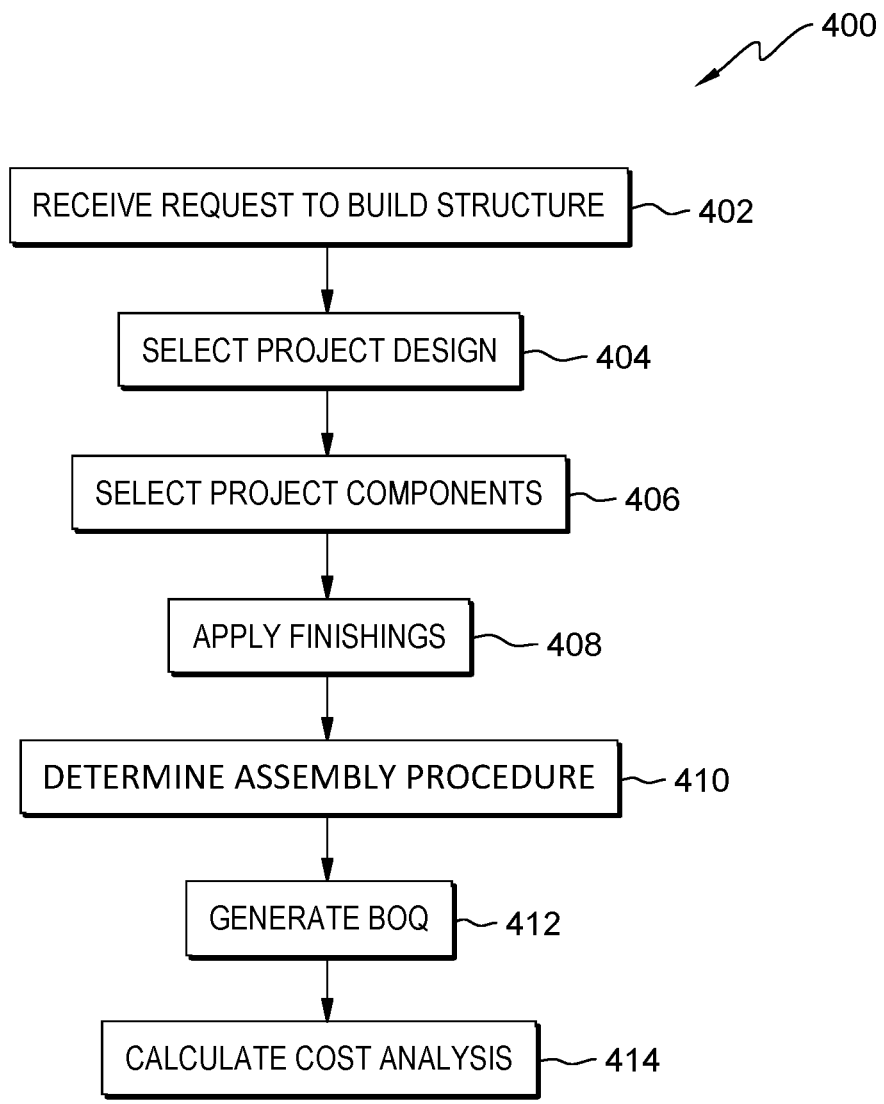
FIG. 4 depicts a flowchart of the operational steps to design, analysis, and implement a structure, in accordance with one embodiment of the present invention.
Figure 6:
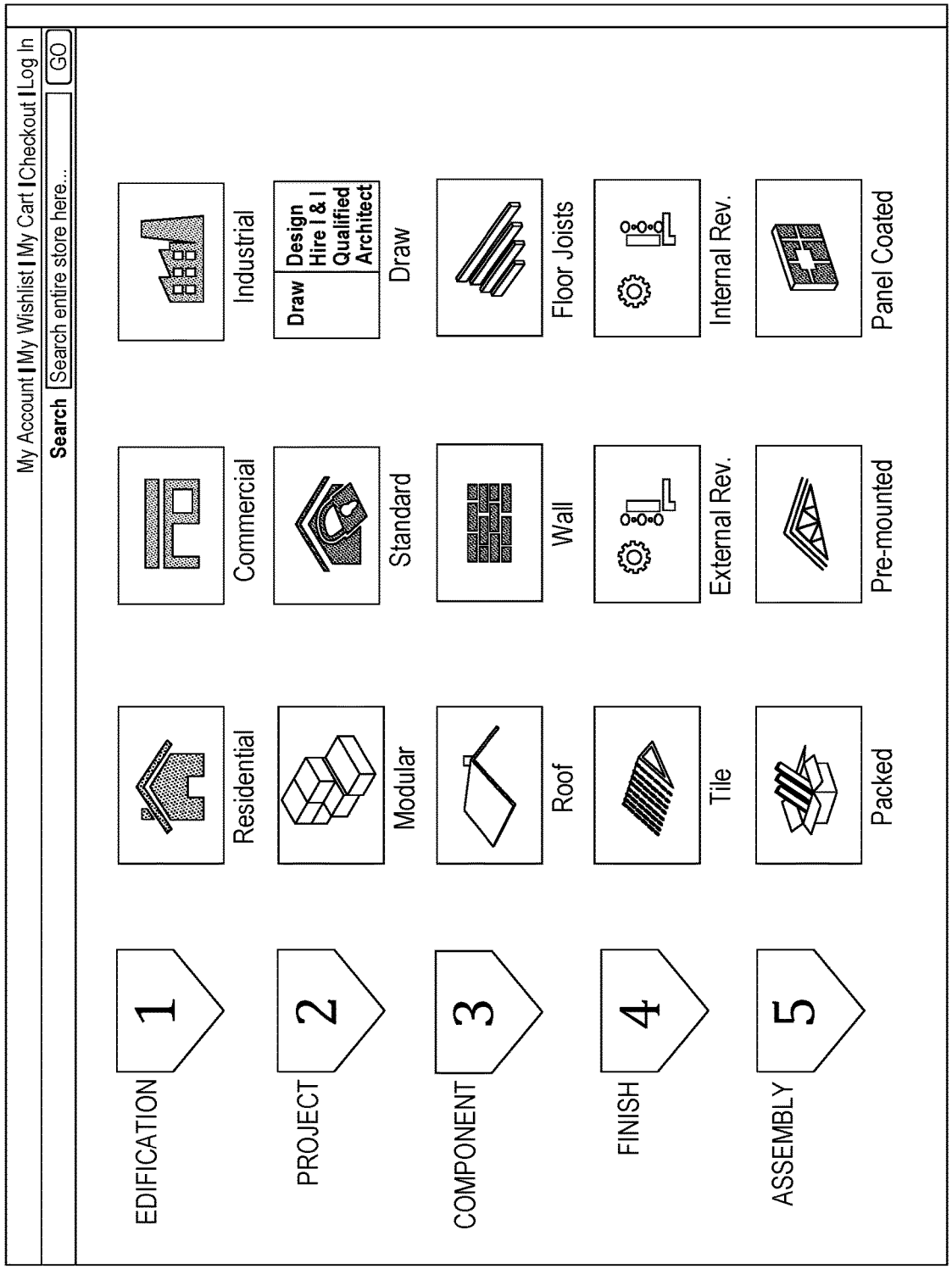
FIG. 6 illustrates a user interface showing the steps and selections of the design process, in accordance with one embodiment of the present invention.
Figure 7:
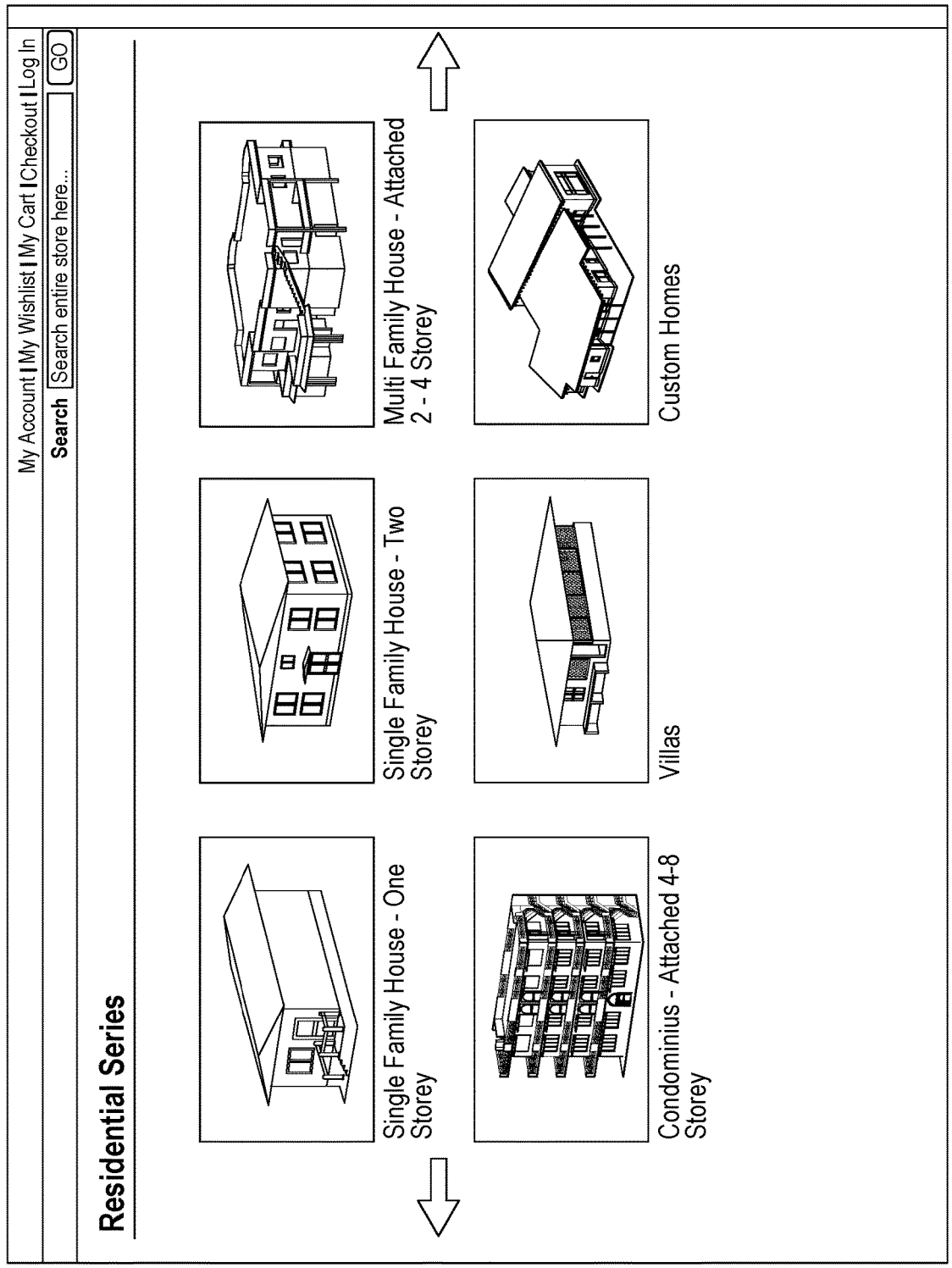
FIG. 7 illustrates a user interface showing virtual models of a structure class, in accordance with one embodiment of the present invention.

FIG. 4 depicts a flowchart 400 of the operational steps to design, analysis, and implement a structure, in accordance with one embodiment of the present invention. The design module 110 first receives the request (step 402) to build a structure. The building of the structure includes all necessary materials, shipping of the materials, and assembly of the structure. FIG. 6 provides an example of a user interface showing the multiple steps which the user will process through to identify each component to generate the final bill of materials and cost. In the depicted embodiment, several icons are able to be interacted with, while other icons are inactive. As the user progresses through the process the active and inactive icons adjust based on the current step the user is on. The request may require the client to input a set of data which identifies various specifications to their construction project, such as cost, location, time scale, lot #, zoning requirements, building type, budget, etc. Upon the receipt of the request, the design module 110 accesses the edification module 302 to collect the plurality of template structure designs within the type of structure the client is requesting. As shown in FIG. 7, a set of templates are presented to the client based on the structure type. In the depicted embodiment, a variety of different template designs are shown and permit the client to select a template which fits their specifications or interest. The design module 110 analyzes the information provided by the client to adjust the templates which are presented to the client. For example, based on the geographical location of the building site, the size of the building site and the geographical limitations of the various vendors, construction companies, and shipping companies which are within a predetermined range of the building site, the design module 110 may hid or remove templates which are not available to the client.

The design module 110 provides the client with a plurality of template structure designs based on the edification type selected. For example, residential, commercial, industrial, institutional, etc. Each class of building types have a plurality of modular and standard designs from which the client is able to choose from. In some instances, the client may request a custom design or create the structure design if a template does not meet their requirements.

Upon the selection 406 by the client of either the modular design, the standard design, or the custom design. The design module 110 provides the client with the opportunity to select various components of the structure design, based on the edification type, structure project, and the geographical location of the building site. The building site location assists the design module 110 with providing materials, components, finishings, and templates which are available to the client based on geographical limitations. For example, if the building site is located beyond the reach of various shipping companies, certain components or finishings may not be available to the client, or the client is alerted that those may require additional costs based on availability.

Figure 8:
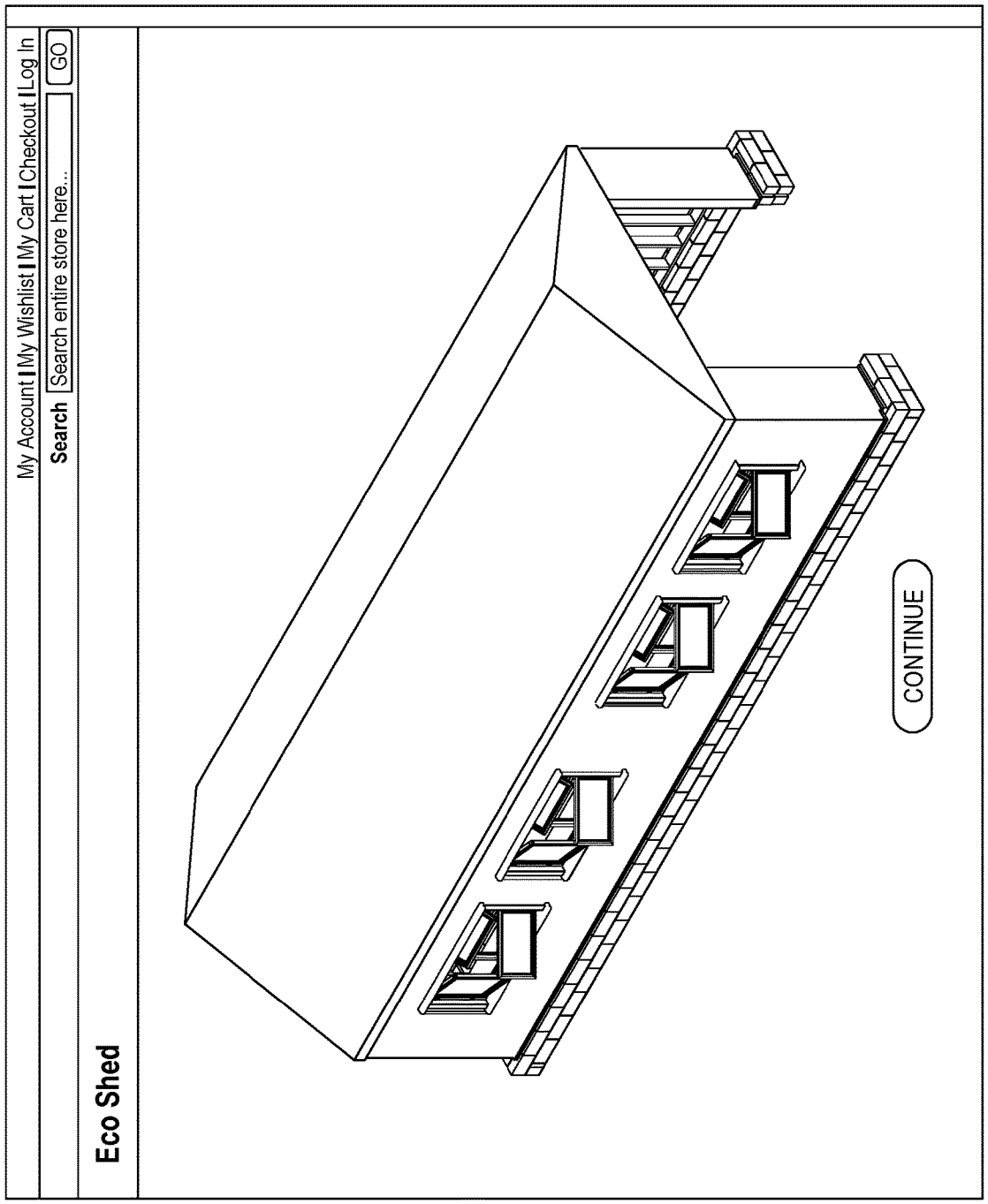
FIG. 8 illustrates a user interface showing an image of the virtual model of the template structure, in accordance with one embodiment of the present invention.
Figure 9:
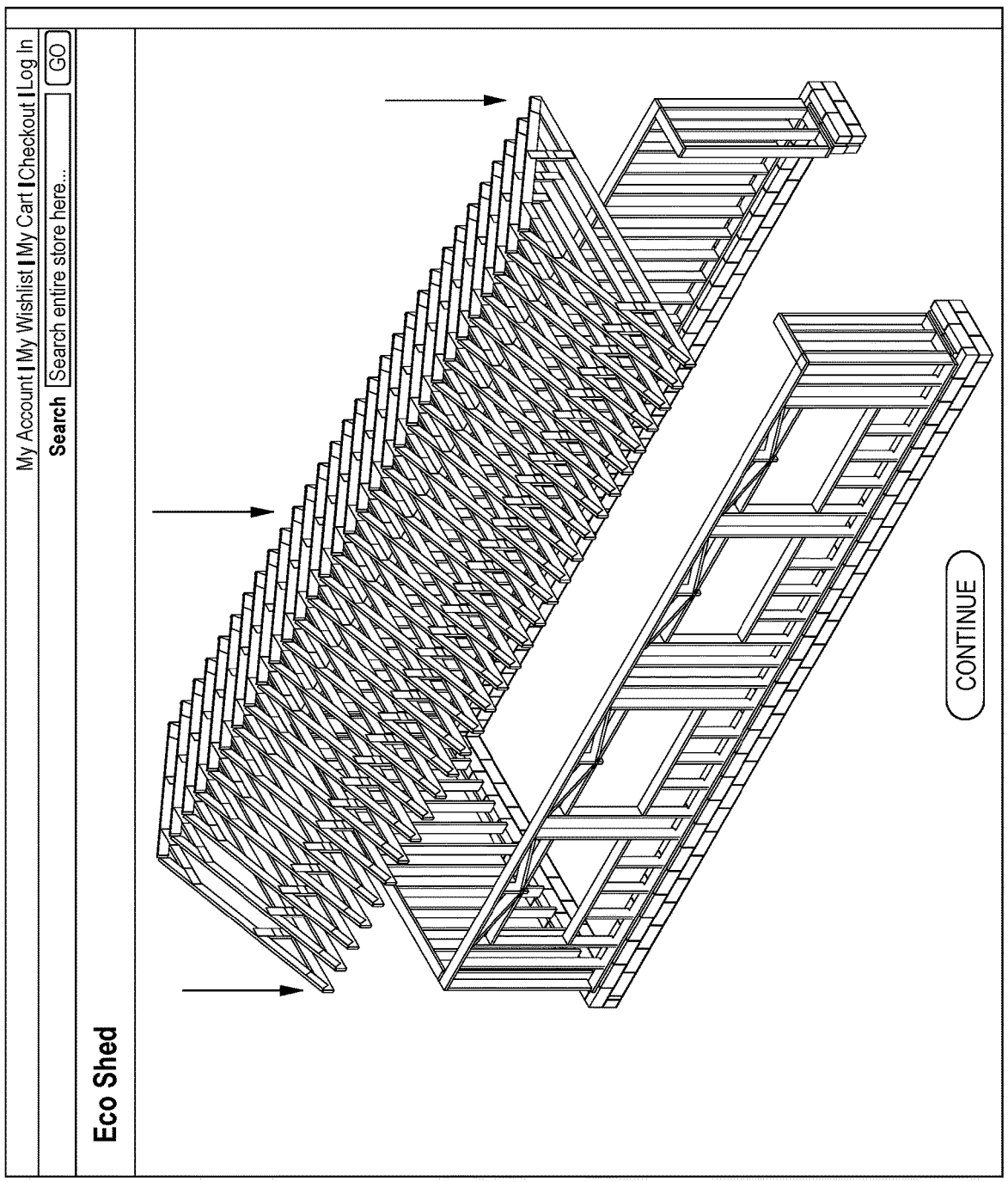
FIG. 9 illustrates a user interface showing an image of the frame of the virtual model, in accordance with one embodiment of the present invention.

FIGS. 8 and 9, depict two images of the selected building model in a completed view and a structural view, respectively. As the client changes or alters the components or finishings, the building model is updated accordingly so the client can see how the changes affect the building. The design module 110 allows the client to cycle through a plurality of images of the structure or interact with a 3D model. This may include add or remove layers from the model, e.g. removing the finishing materials to change the visible members to show just the frame. The layers may be sheathing materials, framing, etc. In some embodiments, the client is able to reposition components as well. With the change of each component, for example the roof, the program is able to update and modify the illustrations or models to show the client the new design.

The design module 110 exports the templates to the client, wherein the client is able to review the templates and access additional information or images of the templates. Once the client has selected a template, the client is able to select the project components. These changes are applied to the template so the client can see the anticipated look of the structure upon the completion of the construction. Similarly, with the applying 408 of the finishings to the template, the client is able to view the changes as they are applied to the template. In some embodiments, the client is virtually transported to the section of the building where the adjustment is made to simplify the process for the client when they make a change to an interior feature, the design engine 110 transports them to that area. With each selection by the client, the design module 110 records this data to assist in the generation of the BOM. At certain component or finishing selections made by the client, the client may also be required to select a manufacture and/or shipping company. As there may be multiple different manufactures for certain materials, the client is required to select one of the available options to permit the design module 110 to process to the next step. For example, with the purchase of bricks for the exterior of the building, the client will need to select the manufacture or seller of the bricks. This allows the design module 110 to have set data when generating the BOM.

Through the customization of the template by the client, the design engine 110 may set limitations to the customizations the client can perform. These may be based on safety, permits, feasibility, cost restrictions, Once the template has been completed, the client is able to select the preparation 410 of the building materials, the shipping methods, the construction time frame, the prefabrication of the structure and the like that are available based on the template design. The design engine 110 generates 412 the BOM for the construction and provides the client with a detailed breakdown on each and every material know, the quantity, the estimated costs, as well as the estimate labor costs and timelines. Once the BOM is created, the client is able to select 414 from the available shipping companies. At this juncture the client is able to proceed with the selection and payment of the project or request additional resources to assist with the process. As depicted in FIG. 11, the material costs are down given various options based on the supplier of the materials to allow the user to select the design time, the cost, and the deliver time for materials. FIG. 12 depicts an example of the ability for the user to select the shipping company based on price, delivery time, and other variables which the user may be interested in using to assess their options.

In some embodiments, based on the degree of detail within the template, furniture and other features of the building may be assessed to determine cost to provide the client with a fully ready home. Depicted in FIG. 14 is an example of the assembly price for various merchandises which the user is able to select to determine the additional work needed. This illustration shows the assembly of various pieces of merchandising, it could include plumbing, electric, HVAC installation, appliance installation (e.g. furnace, stove, refrigerator, etc.) and the like. The module based on what is identified and included in the model is able to provide these options where available.

The estimates calculated and determined by the design module 110 are based on received third party information or calculated values. Based on external forces, these are estimates as to what can occur once the construction process as begun. Due to availability, weather, and other forces at play the design module 110 is unable to account for these, unless information is collected by the modules and incorporated into the calculation.

Throughout the checkout process, the user may have the ability to finance the project through various lenders or the like, depicted in FIG. 13. The user is able to select their payment option and given the information received by the module, the module is able to identify and calculate viable financing options.

In some embodiments, the client may select various types of estimates they are interested in receiving. Certain types of estimates may have greater margins of error as they are collecting data from larger pools of data (e.g. national average shipping costs) and therefore are likely to have a higher margin of error, where more detail and through analysis by the modules is performed. In some instances, a manual request to various manufactures, shipping companies, and construction companies may be performed to get accurate quotes.

Figure 5:
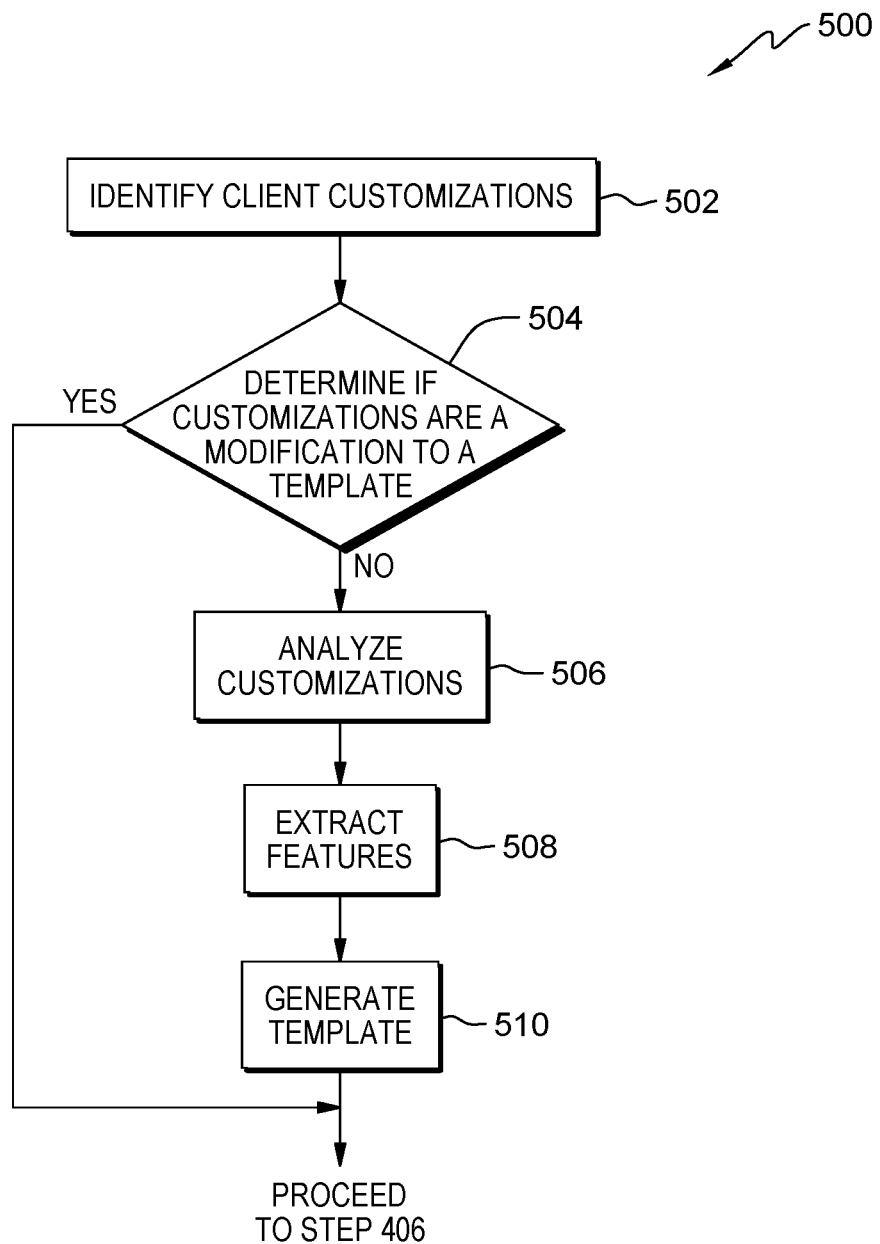
FIG. 5 depicts a flowchart of the operational steps to when designing and analysis a user generated structure, in accordance with one embodiment of the present invention.

FIG. 5 depicts a flowchart 500 of the operational steps when designing and analysis a user generated structure (via illustrations, inputs, drawings, 3d models, etc.), in accordance with one embodiment of the present invention.

Figure 10:
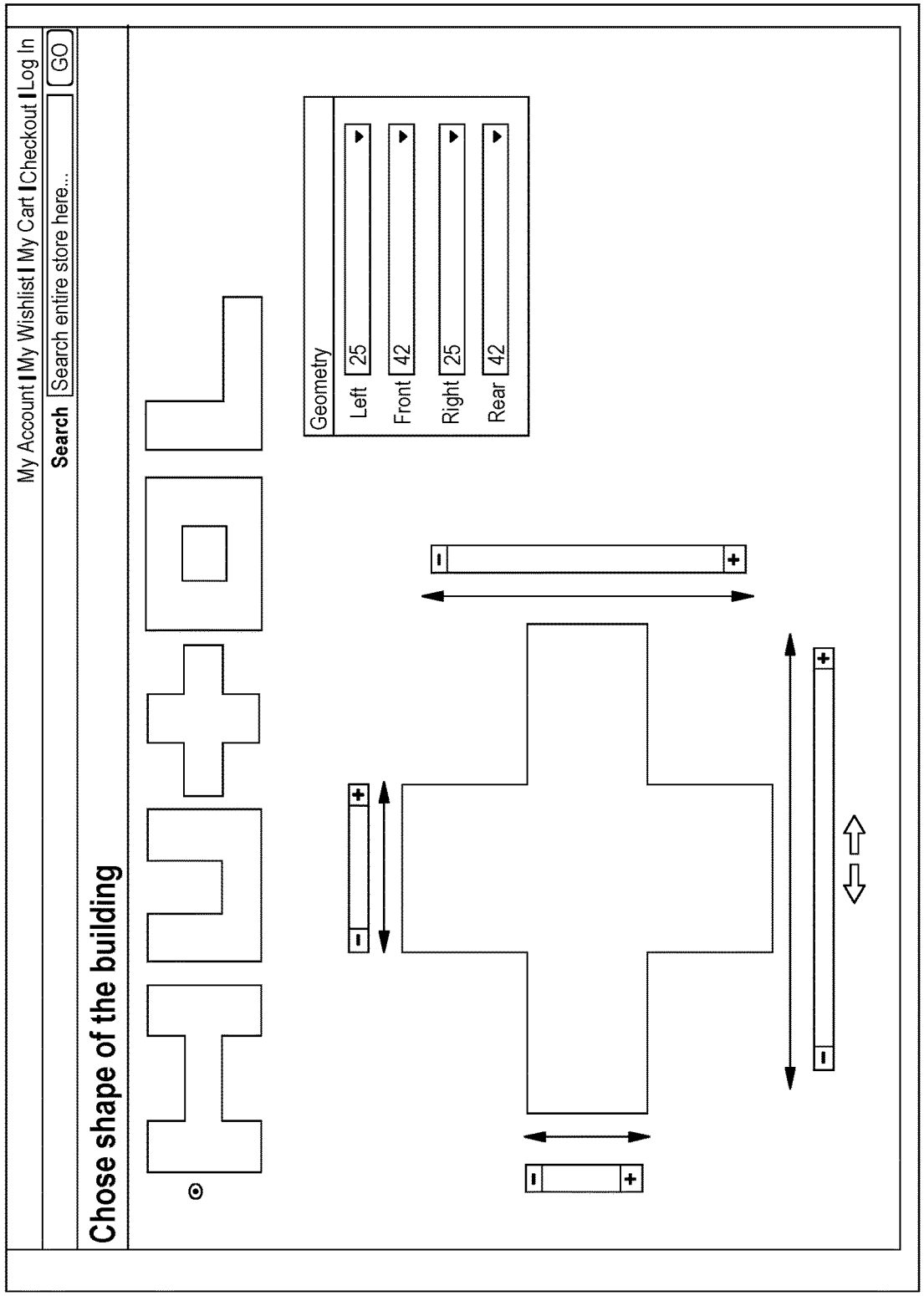
FIG. 10 illustrates a user interface showing a customization feature, in accordance with one embodiment of the present invention.

In some instances, the client may provide customizations 502, which include either a design alteration to a building template, or a complete custom design. The design engine 110 receives and identifies the customizations. These customizations are received at the selection project design step (404). The design engine 110 determines 506 if these source materials are a modification to a building template. For example, a client may select a residential modular design, and customize the shape of the building. This would create an instance where the modules require additional analysis to determine surface area, square footage, and the materials required to construct the new design. If the source materials are a modification to a template the design engine 110, analyzes the received customizations to determine the required modifications to the template and recalculate the structure components to generate a new BOM and model or images of the client design. For example, as shown in FIG. 10, the structure shape has been changed from a general rectangular shape to a cross. Based on the max dimensions set by the client, the design module 110 is able to apply the building design elements of the modular or standard designs to the new shape and generate an updated BOM and model or images of the building. While in some instances this may require minimal alterations to the frame of the building, certain modifications may require structure changes to accommodate redesign and provide a building that is within the necessary safety tolerances and requirements. Therefore, a change to the shape of the building may result in additional changes or modifications to accommodate the change in the shape. In some embodiments, the design module 110 stores the custom design and provides it as a future template.

If the design module 110 is unable to modify a building template to generate the client requested design, the design module 110 analyzes the client customizations 506. The design module 110 analyzes the drawings, descriptions, or models provided by the client to extract 508 the relevant features which are required to generate a new template. This process is heavily based on the customizations provided by the client. In some embodiments, the design module 110 identifies specific reference points to identify the start and end of different walls to construct a frame of the building and then identifies the surfaces of the frame.

Once the design module 110 has extracted adequate information from the client customizations, the design module 110 generates 510 a template of the client design. This design is unrestricted by the previously collected data associated with the building site restrictions. In some embodiments, the design module 110 modifies the newly generated template to adhere to ordinances or building site restrictions. In other embodiments, the design module 110 modifies the newly generated template due to structural feasibility issues. The design module 110 performs a set of modifications to the template to correct the structural defects which minimizing the changes to the template. The design engine 110 identifies these changes and generates a report on the issues for the client.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A computer implemented method for developing a structure design comprising:

generating, by one or more processors, a catalog of building components;

designing, by one or more processors, a set of templates for a set of structure types, wherein each of the set of structure types has a set of minimum characteristics;

receiving, by one or more processors, a set of information associated with a plot;

identifying, by one or more processors, a set of restrictions associated with the plot;

receiving, by one or more processors, a structure type selection;

receiving, by one or more processors, a request of a template for the plot;

manipulating, by one or more processors, the template based on the set of restrictions associated with the plot and alterations received by a client, wherein the set of minimum characteristics of the selected structure type are maintained, and a final design is created;

receiving, by one or more processors, at least one modification to the template;

analyzing, by one or more processors, the at least one modification received, wherein the at least one modification is analyzed to determine if the template based on the plot restrictions can be applied, and if it is determined that the at least one modification received can be applied based on the plot restrictions, the at least one modification will be applied;

manipulating, by one or more processors, the template based on the at least one modification that is able to be applied, by modifying the template;

analyzing, by one or more processors, the final design to identify each building component, wherein building components are identified based on known availability;

producing, by one or more processors, an assembly plan for the final design, wherein the assembly plan includes at least one interactive model of the final design;

determining, by one or more processors, a sequence for assembling the structure, wherein the sequence is used in the analyzing of the bill of materials to determine ordering of the building components; and generating, by one or more processors, a bill of materials for the final design;

identifying, by one or more processors, suppliers based on the final design and the plot;

calculating, by one or more processors, a timeline for the construction of the final design; and tabulating, by one or more processors, at least one cost based on the bill of materials and the construction timeline, wherein the at least one cost includes labor and permits based on a known geographical location of the plot;

transporting the building components to the plot in the determined sequence; and adjusting, by one or more processors, the at least one modification to the template, wherein the at least one modification is adjusted to comply with the restrictions and indicating of the adjustment to the at least one modification.

2. The computer implemented method of claim 1, further comprising, creating, by one or more processors a virtual model of the final design.

3. The computer implemented method of claim 1, further comprising, generating, by one or more processors, a virtual model of the structural design of the building.

4. The computer implemented method of claim 1, wherein a set of alteration is limited to the restrictions on the plot, wherein the restrictions are related to local ordinances.

5. The computer implemented method of claim 1, further comprising, determining a sequence for assembling pre-assembled building components.

6. The computer implemented method of claim 1, wherein the at least one modification to the template is analyzed for safety tolerances.

7. The computer implemented method of claim 1, further comprising, providing, by one or more processors, financing options based on the final design.

8. A computer program product for constructing a building, comprising:
one or more computer readable non-transitory storage media and program instructions stored on the one or more computer readable non-transitory storage media, the program instructions when executed cause at least one processing device to:
compile a catalog of building components and a set of templates of structures, wherein each building component has an associated set of specifications and suppliers;
receive information associated with a plot, wherein the information is analyzed to establish a set of plot restrictions;
receive source material related to a building;
analyze the source material related to a building to a set of templates to determine if the source material related to the building are modifications to a template or an original design;
extract at least one novel feature from the source material, wherein the novel features from the source material is used to create a novel template;
quantify a set of building components of a final design, wherein pre-fabrication requirements are assessed;
generate a bill of materials, wherein the bill of materials identifies approved building component suppliers;
calculate at least one cost estimate based delivery time of materials and build time;
calculate a construction process for the structure based on the building component suppliers, a sequence for assembly, and availability of the building components.

9. The computer program product of claim 8, further comprising, program instructions when executed cause the at least one processing device to, generate a model of the final design.

10. The computer program product of claim 8, wherein the set of alterations are limited to the restrictions on the plot, wherein the restrictions are related to local ordinances.

11. The computer program product of claim 8, further comprising, program instructions when executed cause the at least one processing device to, determine a sequence for assembling building components.

12. The computer program product of claim 8, further comprising, program instructions when executed cause the at least one processing device to, determine a sequence for assembling the structure, wherein the sequence is used in the analyzing of the bill of materials to determine ordering of the building components.

13. The computer program product of claim 12, further comprising, program instructions when executed cause the at least one processing device to, determine the order for transporting the building components to the plot in the determined sequence.

14. A system comprising:
one or more computer processors, one or more computer readable non-transitory storage media, and program instructions stored on the one or more computer readable non-transitory storage media for execution by, at least one of the one or more processors, the program instructions when executed cause the at least one or more processors to:
compile a catalog of building components, wherein each building component has an associated set of specifications and suppliers;
design a set of structure templates, wherein each structure template is related to a specific structure type;
receive information associated with a plot, wherein the information is analyzed to establish a set of plot restrictions;
adjust the set of structure templates based on the plot restrictions;
receive a request to build a structure type on the plot;
provide a set of allowed structure templates for the plot based on the plot restrictions;
receive selection of a structure template;
receive a set of modifications to the structure template, wherein the set of modifications are analyzed relative to the structure template to determine alterations that are required to be made to the structure template to apply the set of modifications;
generate an alert when the set of modifications have an affect on a construction price or render supplies or suppliers unavailable;
manipulate the structure template based on the set of modifications; create a new structure template based on the modified structure template;
quantify building components of a final design, wherein pre-fabrication requirements are assessed;
generate a bill of materials, wherein the bill of materials identifies approved building component suppliers;
calculate a construction process for the structure based on the building component suppliers, a sequence for assembly, permit costs, and availability of the building components, wherein the construction process includes a construction price; and
establish shipping and construction parties and timelines.

15. The system of claim 14, further comprising, program instructions when executed cause the at least one or more processors to, generate a virtual model of the final design, wherein the final design is interactive.

16. The system of claim 14, further comprising, program instructions when executed cause the at least one or more processors to, receive a set of illustrations associated with a structure design and generating a virtual model from the illustrations.

17. The system of claim 14, wherein the set of alterations are limited to the restrictions on the plot, wherein the restrictions are related to local ordinances.

* * * * *